Patented Sept. 17, 1940

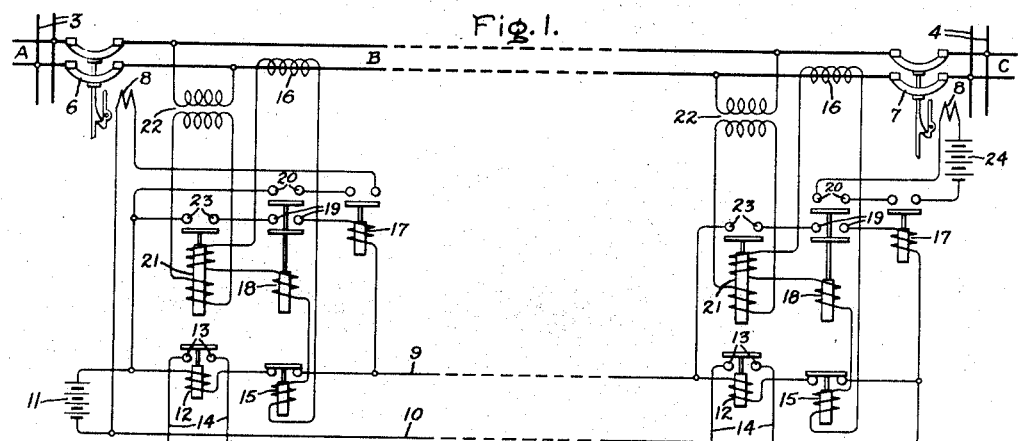
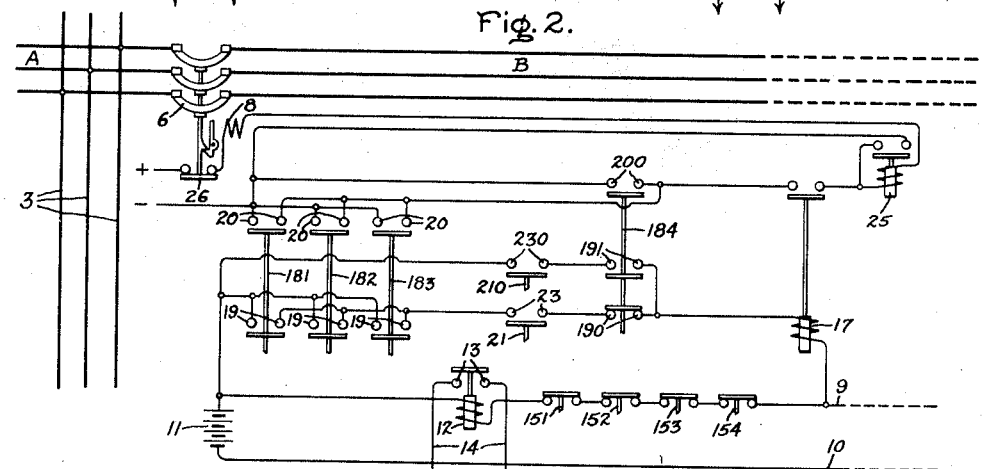
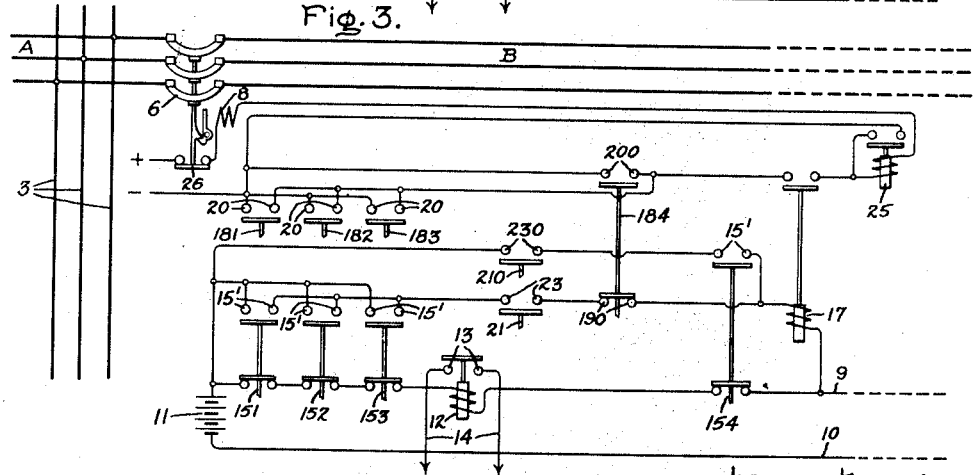
Inventor:
Charles R. Mason,
by Harry E. Dunham
His Attorney.

2,214,858

UNITED STATES PATENT OFFICE 2,214,858

PROTECTIVE ARRANGEMENT FOR ELECTRIC POWER CIRCUITS

Charles R. Mason, Schenectady, N. Y., assignor to General Electric Company, a corporation of New York Application February 23, 1939, Serial No. 257,939

20 Claims. (Cl. 175—294)

My invention relates to improvements in protective arrangements for electric power circuits and more particularly to improvements in protective arrangements of the pilot circuit control type disclosed in Letters Patent of the United States, 1,950,193, dated March 6, 1934, and assigned to the assignee of this invention. The general object of my invention is to provide an improved pilot circuit control which is continuously supervised, is very flexible in application to system sections regardless of the number of line terminals and parallel portions, requires but one source of current for energization, and provides high speed discriminating protection.

In discriminating protective arrangements for effecting the disconnection of a section of a power line or system only on the occurrence of a fault on the section by means of auxiliary control currents over pilot circuits, any break in the pilot conductors, which are sometimes rented from the telephone company, should make itself known immediately. Otherwise the protective system may fail when it is most needed. This is particularly the case where dependence is placed on the continuity of the pilot circuit for tripping on internal faults. In accordance with my invention, I provide a continuously energized pilot circuit so supervised as to make known substantially instantly any interruption in the continuity of the circuit without, in any way, jeopardizing the line protection. Where sources of direct current, such as batteries at the stations, are used to energize the pilot circuit, it is frequently disadvantageous to interconnect the batteries of two different stations because of methods of grounding the batteries and also because trouble on one battery affects the other. Moreover, the use of a battery at each station is impossible when an attempt is made to provide pilot wire protection for two or more parallel lines between stations. In accordance with my invention, I provide a pilot circuit protective arrangement in which only one source of current is necessary for energizing the pilot circuit. This source may be a direct current source at the most convenient station location but alternating current may also be used. Further in accordance with my invention, I use a live pilot circuit for tripping on internal faults in order to obtain high speed protection. Also in accordance with my invention I provide an extremely flexible protective arrangement which is readily and simply extended to cover a line section even though more than two terminals are involved. These and other objects of my invention will appear in more detail hereinafter.

This application is a continuation in part of my copending application, Serial No. 210,449, filed May 27, 1938, for Protective arrangement for electric power circuits, the subject matter in said prior application being incorporated in this application together with additional subject matter.

My invention will be better understood from the following description when considered in connection with the accompanying drawing, and its scope will be pointed out in the appended claims.

In the accompanying drawing Fig. 1 illustrates diagrammatically an embodiment of my invention, shown single phase for simplicity, Fig. 2 illustrates diagrammatically an embodiment of my invention as applied to a three-phase grounded neutral circuit, the protective relay windings being omitted for simplicity in understanding the invention, and Fig. 3 illustrates diagrammatically a modification of the embodiment of my invention shown in Fig. 2.

In Fig. 1, I have illustrated an embodiment of my invention as applied to a section B of an alternating current system. This section may be, for example, a power line extending between two stations shown as busses 3 and 4. For simplicity in illustrating my invention, the power line is shown single phase. The section B is connected to the busses 3 and 4 by suitable interrupting means which are illustrated as latched closed circuit breakers 6 and 7 respectively. As illustrated, these are provided with trip coils 8. The power line may include other sections A and C suitably connected to the busses 3 and 4 respectively.

For controlling the circuit breakers 6 and 7 so as to disconnect the section B from the system only when a fault occurs on this section, I provide in accordance with my invention a normally energized pilot circuit comprising conductors 9 and 10 extending in general from one end of the section to the other. Further in accordance with my invention, I so arrange the control of the circuit breakers 6 and 7 that only one source of current, such as a battery 11 at station 4, is necessary for energizing the pilot circuit. In order to detect any break or interruption in the continuity of the pilot circuit, I provide at each station means, such as an auxiliary relay 12, whose winding is in series relation in the pilot circuit. This relay through its contacts 13, which are open as long as the pilot circuit is energized, controls an alarm and indicating circuit 14 which consequently is energized upon any interruption in the flow of current in the pilot circuit.

In order that the pilot circuit may be continuously energized under normal line conditions and yet be adapted to effect the opening of one or both of the section circuit breakers under faulty conditions, I arrange in accordance with my invention to control the pilot circuit by a circuit opening fault detector relay 15 at each station. The normally closed contacts of these relays are in series relation in the pilot circuit. As shown, the fault detector relay 15 is a simple overcurrent relay having its winding energized from a current transformer 16 connected in the power line. However, as far as my invention is concerned, any relay which will respond to a fault on the system, including the power line, can be used. Thus, as will be apparent to those skilled in the art, the fault detector may be of the type which responds to voltage only, for example an undervoltage relay, or of the type which responds to both current and voltage, for example a relay of the so-called distance type which responds to circuit impedance or a component thereof.

For controlling the circuit of the tripping coil 8 of the circuit breaker at each station, I provide a circuit-closing tripping relay 17, which in accordance with my invention is arranged to be energized only on the occurrence of predetermined faulty conditions of the circuit. These predetermined faulty conditions are internal faults, that is, faults on the section B under protection. In order to secure this operation, I arrange through suitable fault responsive means to connect this relay in a circuit across that portion of the pilot circuit which includes the winding of the supervising relay 12 and the contacts of the fault detector 15. As illustrated, the fault responsive means for controlling the circuit of the tripping relay 17 includes a second fault detector 18 and a power directional responsive relay 21. The second fault detector 18 is also shown as a simple circuit closing overcurrent relay but, as will be obvious to those skilled in the art, this relay may be of the undervoltage type or the so-called distance or impedance responsive type. This second fault detector 18 has normally open contacts 19 in the circuit of the winding of the tripping relay 17 and may also control normally open contacts 20 in the circuit of the circuit breaker trip coil 8. The power directional relay 21 is illustrated simply as comprising a current winding connected to be energized from the current transformer 16 and a potential winding connected to be energized from a potential transformer 22. This relay may be of any suitable type, examples of which are well known to the art. Thus it may be an induction disk type of relay or the higher speed induction cup type of relay. It may also include a well known voltage restraint feature to prevent operation on a mere change in the direction of power without an actual fault condition. The power directional relay 21 controls normally open contacts 23 in the circuit of the tripping relay 17 and is so connected and arranged as to tend to close its contacts on power flow from the bus into the section. At the station where the battery 11 is located the circuit breaker trip coil 8 may be energized from this battery, but at the other station the circuit breaker trip coil 8 will be energized from the battery 24 at that station.

It will be observed that the relays 12 by virtue of their respective resistances, which are preferably substantially equal, constitute current limiting means by which the normal current flow in the pilot circuit is reduced to a satisfactory value. Obviously, if the relays 12 are omitted, then other suitable current limiting means should be provided. In order to insure substantially the same current flow in the pilot circuit under the different possible fault responsive operations as under normal power circuit conditions, the resistance of each of the relays 17 may be made substantially the same as that of one of the relays 12. If this is done, then in every case the resistance of the pilot circuit is the same and includes the resistance of two of the relays 12, two of the relays 17, or one of each.

Under normal conditions, the parts are positioned, as shown in Fig. 1, and the pilot circuit is energized from the source 11 because the fault detector relays 15 have their contacts closed. The supervising relay 12 at each station is energized with its contacts 13 in the supervising circuit 14 open. In case of a fault on the system of which the line section B is a part, the fault detector relay 15 at one or both stations will open. Assuming that the fault is not on the section B but is fed through the section B, then both of the fault detectors 15 will operate thereby deenergizing the pilot circuit and the supervising relay at each station to give an indication that the pilot circuit is open. At the station where power flows from the bus into the section B, the power directional relay 21 will operate to close its contacts. Assuming that power flow is from section A to section B and thence to section C, the fault detector 18 and the power directional relay 21 at station 3 will operate to complete a circuit for the tripping relay 17 across the contacts of the fault detector 15 and the supervising relay 12 at station 3. However, this does not effect the energization of the pilot circuit because at station 4, where power flow is from the section B to the bus, the powered directional relay 21 keeps its contacts 23 open, and since the pilot circuit is also open at the contacts of the fault detector relay 15, no current can flow in the pilot circuit to energize the tripping relay 17 at station 3. Moreover, no current can flow in the winding of the tripping relay 17 at station 4 because the contacts 23 of the power directional relay 21 at this station are open. Consequently the circuits of the trip coils 8 at the two stations remain deenergized, and the section B stays connected in the system.

Assuming now an internal fault, that is to say, a fault on the section B which is fed from only one end, for example from bus 3 to section B. Under these conditions, the fault detector relay 15 at station 3 opens its contacts in the pilot circuit as before, but the fault detector 15 at station 4 does not operate. Also the fault detector relay 18 and the power directional relay 21 at station 3 operate to complete the circuit of the tripping relay 17 at this station. Since the pilot circuit is not open at station 4, the tripping relay 17 at station 3 is thus energized to complete the circuit of the trip coil 8 of circuit breaker 6. In this way section B is disconnected from the system at station 3. At station 4 neither the second fault detector 18 nor the power directional relay 21 operates and the circuit breaker 7 remains closed as it was. This is immaterial since it was assumed that there was no power flow into section B from the bus 4. In order to obtain the desired sequence of operation, the fault detector relay 15 preferably is arranged to operate somewhat in advance of the fault detector relay 18. This may be accomplished by giving the fault detector relay 15 a more sensitive or lower setting than that of the fault detector relay 18. Instead of using two separate fault detectors of different sensitivities, I may use a single fault detector which controls two different contacts with different sensitivities. Examples of such fault detectors are well known to the art. Under some conditions, I may even wish to use a single sensitivity fault detector both to open the pilot circuit and also to close the circuit of the tripping relay.

In the event of a fault on section B fed from both busses 3 and 4, the fault detector 15 at each station operates, thus interrupting the pilot circuit at two points and causing the dropout of the supervising relay 12 at each station and a suitable alarm thereby. Also, since power flow now at each station is from the bus into the section B, the power directional relay 21 at each station operates, and since there is fault current indication at each station, the second fault detector 18 at each station operates. Consequently at each station the circuit of the tripping relay 17 is completed across the contacts of the fault detector relay 15 and the winding of the supervising relay 12 at the station. The pilot circuit 9, 10 is accordingly completed at each end through the winding of the tripping relay 17 at the end, and the contacts 23 and 19 of the power directional relay and the second fault detector respectively at that end. In consequence the tripping relay 17 at each end is energized, and it, together with the second fault detector 18, completes the trip coil circuit at the end, thereby effecting the tripping of the circuit breaker at that end and the isolation of the section B from the system.

In Fig. 2 I have illustrated my invention as applied to one end of a section B of a three phase grounded neutral power circuit. The arrangement at the other end will be obvious by comparison with Fig. 1 since there is no essential difference beyond the difference in the battery connection to the trip coil. Since the connections of the windings of the fault responsive relays will be obvious to those skilled in the art and are generally indicated in Fig. 1, they are omitted for simplicity in understanding the control circuits. In the case of a three phase circuit, I provide three first, or sensitive, fault detectors 151, 152 and 153 for faults between phase conductors and a fourth also sensitive fault detector 154 for faults between any conductor and ground. These four fault detectors have their contacts in series with each other in the pilot circuit. Across these series connected contacts and the winding of the supervising relay 12 and in the circuit of the tripping relay 17 are the normally open parallel-connected contacts 19 of the second, or high set, fault detectors 181, 182 and 183 which respond to faults between phase conductors on the system. In series with the contacts 19 are the contacts 23 of the power directional relay 21 which may be a polyphase relay, examples of and connections for which are well known to the art. In case single phase power directional relays are used, the contacts of each would be connected in series with the contacts of its associated fault detector and these groups of series connected contacts in parallel with each other.

For faults-to-ground of any system phase conductor, I provide a ground fault detector 184 which, in order to provide preferential control for ground faults, may have normally closed contacts 190 in series with the contacts 19 and 23 and normally open contacts 191 in series with the contacts 230 of a ground power directional relay 210. The ground power directional relay 210 responds to the direction of flow of ground fault power in the section B at the station 3. The contacts 230 and 191 of the ground fault responsive relays 210 and 184 are connected in series across the series-connected contacts 19, 23 and 190 and in series with the winding of the tripping relay 17. A series seal-in relay 25 may be arranged as shown to take over the duties of the contacts of the high set fault detectors and the tripping relay. This relay, when energized, seals itself in to maintain the trip coil circuit definitely closed regardless of any change in the condition of the contacts of the fault responsive relays and the tripping relay. In Fig. 2 the circuit breaker 6 is shown as equipped with an auxiliary switch 26 of the "a" type, which opens when the circuit breaker opens to interrupt the circuit of the trip coil and also to deenergize the seal-in relay 25. The operation of the embodiment of my invention, shown in Fig. 2, will be apparent from the foregoing particularly in connection with the explanation of the operation of the embodiment of my invention shown in Fig. 1.

If a power system includes parallel lines with a generating source at only one end or a large source at one end and a relatively small source at the other end or if there may normally be large generation at both ends but under some conditions no generation at one end, then there may be insufficient fault current at one end to operate one of the high set fault detectors 181, 182, 183, 184 at this one end. In this case the pilot circuit would be opened at the low current end of the section by one of the low set fault detectors 151, 152, 153, 154 but would not be closed by a high set fault detector at this end. With the pilot circuit thus opened at this end, no tripping could occur at either end. Although the probability of this happening may be greatly reduced by the use of a distance relay type of fault detector, I may, in accordance with my invention, as shown in Fig. 3, substitute for the normally open contacts 19 on the high set phase fault detectors 181, 182, 183 and the normally open contacts 191 of the high set ground fault detector 184 normally open contacts 15' on the low set fault detectors 151, 152, 153, 154. Thus, whenever there is enough fault current to operate a low set fault detector, the possibility of an open pilot circuit, which would prevent tripping on an internal fault fed from both ends, is eliminated. In other words, the energization of the tripping relay 17 at the high current end is assured in case of an internal fault even though the high set fault detectors do not operate at the lower current end. Subsequently, tripping will occur at the other or low current end since, upon the opening of the circuit breaker in the faulty line at the higher current end, enough current will in general flow over the sound feeder to supplement the current supplied to the faulty feeder at the low current end to insure the operation of the high set fault detector. Even in those cases where there is initially a relatively small input at one end, this sequential tripping may be minimized by the use of a distance relay type of fault detector.

It will be obvious to those skilled in the art that protective arrangements embodying my invention are readily extended to apply to lines having more than two terminals since all that is necessary is to continue the pilot circuit from terminal to terminal and provide each terminal with the protective equipment and control relays, shown in the drawing, at each station.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. A protective arrangement for an electric power circuit having a circuit interrupter therein comprising a pilot circuit extending between two points of the power circuit, a source of current for energizing said pilot circuit, fault responsive means at each of said points jointly operative under normal conditions of the power circuit to maintain the pilot circuit continuously energized from said source and under faulty conditions of the power circuit to deenergize the pilot circuit, tripping means, and means for effecting the energization of the tripping means from the pilot circuit on the occurrence of predetermined faulty conditions of the power circuit.

2. In a protective arrangement for an electric power circuit having a circuit interrupter therein, means for controlling the opening of said circuit interrupter comprising a pilot circuit extending between two points of the power circuit, a source of current for energizing said pilot circuit, means for tripping said circuit interrupter, a first fault detector at each of said points, said first fault detectors being jointly operative under normal conditions of the power circuit to maintain the pilot circuit continuously energized from said source and under faulty conditions of the power circuit to tend to effect the deenergization of the pilot circuit, and means for replacing the pilot circuit control of one of said first fault detectors and for energizing said tripping means from said pilot circuit on the occurrence of predetermined faulty conditions of the power circuit comprising a second fault detector and a power directional relay.

3. In a protective arrangement for an electric power circuit having a circuit interrupter therein, means for controlling the opening of the circuit interrupter comprising a pilot circuit extending between two points of the power circuit, a source of current at one of said points for energizing said pilot circuit, a first fault detector at each of said points having normally closed contacts in series relation in the pilot circuit operative on the occurrence of faults on the power circuit to open its contacts, a tripping relay having a winding, and means responsive to predetermined faulty conditions of the power circuit for connecting said winding in the pilot circuit across the contacts of one of said first fault detectors.

4. In a protective arrangement for an electric power circuit having a circuit interrupter therein, means for controlling the opening of said circuit interrupter comprising a pilot circuit extending between two points of the power circuit, a source of current for energizing said pilot circuit, a first fault detector at each of said points said first fault detectors being jointly operative under normal conditions of the power circuit to maintain the pilot circuit continuously energized from said source and under faulty conditions of the power circuit to deenergize the pilot circuit, a tripping relay having a winding, and means comprising a second fault detector and a power directional relay for connecting said winding in the pilot circuit and for effecting the energization of the pilot circuit on the occurrence of predetermined faulty conditions of the power circuit.

5. In a protective arrangement for an electric power circuit having a circuit interrupter therein, means for controlling the opening of said circuit interrupter comprising a pilot circuit extending between two points of the power circuit, a source of current for energizing said pilot circuit, a first fault detector at each of said points said first fault detectors being jointly operative under normal conditions of the power circuit to maintain the pilot circuit continuously energized from said source and under faulty conditions of the power circuit to deenergize the pilot circuit, a tripping relay having a winding, means comprising a second fault detector and a power directional relay for connecting said winding in the pilot circuit and for effecting the energization of the pilot circuit on the occurrence of predetermined faulty conditions of the power circuit, and means including a relay having a winding connected in the pilot circuit to be deenergized on any interruption of the pilot circuit including the operation of one of said first fault detectors.

6. In a protective arrangement for an electric power circuit having a circuit interrupter therein, means for controlling the opening of the circuit interrupter comprising a pilot circuit extending between two spaced points of the power circuit, a source of current at one of said points for energizing said pilot circuit, a low set fault detector at each of said points having normally closed contacts in series relation in said pilot circuit operative on the occurrence of faults on the power circuit to open its contacts, a tripping relay having an energizing winding, and means for connecting said winding in the pilot circuit across the contacts of one of said first fault detectors on the occurrence of predetermined faulty conditions of said power circuit whereby to effect the tripping operation of said tripping relay including a high set fault detector and a power directional relay having normally open contacts in series relation with said winding.

7. A protective arrangement for an electric power circuit having a circuit interrupter therein comprising a pilot circuit extending between two points of the power circuit, a source of current for energizing said pilot circuit, a first fault detector at each of said points said first fault detectors being jointly operative under normal conditions of the power circuit to maintain the pilot circuit continuously energized from said source and under faulty conditions of the power circuit to deenergize the pilot circuit, tripping means, and means comprising a second fault detector and a power directional relay for effecting the energization of the tripping means from the pilot circuit on the occurrence of a fault on the power circuit between said two points.

8. In a protective arrangement for an electric power circuit having a circuit interrupter at each of two spaced points thereof, means for controlling the opening of said circuit interrupters comprising a pilot circuit, a source of current for energizing said pilot circuit, a first fault detector at each of said points said first fault detectors being jointly operative under normal conditions of the power circuit to maintain the pilot circuit continuously energized from said source and under faulty conditions of the power circuit to deenergize the pilot circuit, a tripping relay at each of said points, and means comprising a second fault detector and a power directional relay at each of said points for connecting the tripping relay at the point in the pilot circuit to effect a tripping operation of the tripping relay on the occurrence of predetermined faulty conditions of the power circuit.

9. In a protective arrangement for an electric power circuit having a circuit interrupter therein, means for controlling the opening of said circuit interrupter comprising a pilot circuit extending between two points of the power circuit, a source of current at one of said points for energizing the pilot circuit, a low set fault detector at each of said points, each of said fault detectors including normally closed contacts in series relation in said pilot circuit, a tripping relay at each of said points, and means comprising a high set fault detector and a power directional relay for completing a circuit across the contacts of the low set fault detector at one point and energizing the tripping relay at said point on the occurrence of predetermined faulty conditions of the power circuit.

10. In a protective arrangement for an electric power circuit having a circuit interrupter therein, means for controlling the opening of said circuit interrupters comprising a pilot circuit extending between two points of the power circuit, a source of current at one of said points for energizing said pilot circuit, an auxiliary relay having a winding connected in series relation in the pilot circuit, a low set fault detector at each of said points, each of said fault detectors including normally closed contacts in series relation in said pilot circuit, a tripping relay at each of said points, and means comprising a high set fault detector and a power directional relay for completing a circuit across the contacts of the low set fault detector and the winding of the auxiliary relay at one point and for effecting the energization of the tripping relay at said point on the occurrence of predetermined faulty conditions of said power circuit.

11. In a protective arrangement for an electric power circuit having a circuit interrupter at each of two spaced points thereof, means for controlling the opening of said circuit interrupters comprising a pilot circuit, a source of current for energizing said pilot circuit, an auxiliary relay at each of said points having a winding connected in series relation with the pilot circuit, a first fault detector at each of said points, said first fault detectors being jointly operative under normal conditions of the power circuit to maintain the pilot circuit continuously energized from said source and under faulty conditions of the power circuit to deenergize the pilot circuit, a tripping relay at each of said points, means comprising a second fault detector and a power directional relay for effecting the energization of the tripping relay at the point from the pilot circuit and for maintaining the auxiliary relay deenergized on the occurrence of predetermined faulty conditions of the power circuit.

12. In a protective arrangement for an electric power circuit having a circuit interrupter at each of two spaced points thereof, means for controlling the opening of said circuit interrupters comprising a pilot circuit, a source of current for energizing said pilot circuit, an auxiliary relay at each of said points having a winding connected in series relation with the pilot circuit, a first fault detector at each of said points, said first fault detectors being jointly operative under normal conditions of said power circuit to maintain the pilot circuit continuously energized from said source and under faulty conditions of the power circuit to deenergize the pilot circuit, a tripping relay at each of said points, means comprising a second fault detector and a power directional relay at each of said points for effecting the energization of the tripping relay at the point from the pilot circuit and for maintaining the auxiliary relay deenergized on the occurrence of predetermined faulty conditions of the power circuit, and means controlled by the second fault detector and the tripping relay at each point for effecting the opening of the circuit interrupter at the point.

13. In a protective arrangement for an electric circuit, a normally energized pilot circuit, means connected to the electric circuit for effecting an interruption in said pilot circuit in response to faulty conditions of the electric circuit, a control device having a winding, and means responsive to certain of said faulty conditions of the electric circuit for completing a circuit for said winding across the interruption in said pilot circuit.

14. In a protective arrangement for an electric circuit, a normally energized pilot circuit, means connected to the electric circuit for effecting a plurality of interruptions in said pilot circuit in response to predetermined faulty conditions of the electric circuit, a plurality of control devices each having a winding, and means responsive to one of said faulty conditions of the electric circuit for respectively connecting the windings of said control devices across the interruptions in said pilot circuit.

15. In a protective arrangement for an electric circuit, a single source of current, a pilot circuit normally energized from said source, means connected to the electric circuit for effecting one or more interruptions in the pilot circuit in response to faulty conditions of the electric circuit, a plurality of control devices each having a winding, and means responsive to that one of the faulty conditions which produces a single interruption in the pilot circuit for connecting the winding of one of said devices across said interruption in series in the pilot circuit and to faults causing more than one interruption for connecting the control device windings respectively across the different interruptions in series in the pilot circuit.

16. In a protective arrangement for an electric power circuit having a circuit interrupter at each of two spaced points thereof, means for controlling the opening of said circuit interrupters comprising a pilot circuit, a source of current for energizing said pilot circuit, current limiting means at each of said points connected in series relation with the pilot circuit, each of said current limiting means having substantially the same current limiting effect, a fault detector at each of said points, said fault detectors being jointly operative under normal conditions of the power circuit to maintain the pilot circuit continuously energized from said source and under faulty conditions of the power circuit to deenergize the pilot circuit, a tripping relay at each of said points, each of said tripping relays having substantially the same current limiting effect as each of said current limiting means, and fault responsive means at each of said points for completing a circuit including said tripping relay across the contacts of the fault detector and the current limiting means at the point.

17. In a protective arrangement for an electric circuit, a normally energized pilot circuit, current limiting means connected in series relation in said circuit, means connected to the electric circuit for effecting an interruption in said pilot circuit in response to faulty conditions of the electric circuit, a control device having a winding the current limiting effect of said winding being substantially the same as the current limiting effect of said current limiting means, and means responsive to certain of said faulty conditions of the electric circuit for completing a circuit for said winding across the interruption in said pilot circuit.

18. In a protective arrangement for an electric circuit, a source of current, a pilot circuit normally energized from said source, means connected to the electric circuit for effecting one or more interruptions in the pilot circuit in response to faulty conditions of the electric circuit, a plurality of control devices each having a winding, means responsive to that one of the faulty conditions which produces a single interruption in the pilot circuit for connecting the winding of one of said devices across said interruption in series in the pilot circuit and to faults causing more than one interruption for connecting the control device windings respectively across the different interruptions in series in the pilot circuit, and means for maintaining the effective resistance of the pilot circuit substantially constant independently of the number of interruptions in the pilot circuit.

19. In a protective arrangement for an electric power circuit, a pilot circuit extending between two points of the electric circuit, a source of current for energizing said pilot circuit, current limiting means connected in series relation in said pilot circuit, a control relay, and fault responsive means for effecting an interruption in said pilot circuit and subsequently connecting said control relay across said interruption and said current limiting means for a predetermined direction of power flow in the electric circuit.

20. In a protective arrangement for an electric power circuit having a circuit interrupter therein, means for controlling the opening of said circuit interrupter comprising a pilot circuit extending between two points of the power circuit, a source of current for energizing said pilot circuit, current limiting means connected in series relation in said pilot circuit and having a predetermined current limiting effect, a control relay having substantially the same current limiting effect as said current limiting means, fault responsive means comprising a first fault detector for effecting an interruption in said pilot circuit and subsequently connecting said control relay across said interruption and said current limiting means, a second fault detector, and means controlled by said control relay and said second fault detector for effecting the opening of said circuit interrupter.

CHARLES R. MASON.